United States Patent [19]

Taylor

[11] Patent Number: 5,491,320
[45] Date of Patent: Feb. 13, 1996

[54] METHOD AND APPARATUS FOR WELDING VENTILATION

[75] Inventor: Kenneth D. Taylor, Troy, Mich.

[73] Assignee: Apex Engineering Company, Madison Heights, Mich.

[21] Appl. No.: 315,544

[22] Filed: Sep. 30, 1994

[51] Int. Cl.$^6$ ............................................. B23K 9/16
[52] U.S. Cl. ............................ 219/137.41; 219/125.1
[58] Field of Search ............................ 219/137.41, 125.1, 219/136, 74; 454/64, 66

[56] References Cited

U.S. PATENT DOCUMENTS

| | | |
|---|---|---|
| 2,284,648 | 6/1942 | Foreman . |
| 2,389,969 | 11/1945 | Fadeley . |
| 2,592,505 | 4/1952 | Wolfe . |
| 2,768,278 | 10/1956 | Gaines ............................ 219/74 |
| 2,772,625 | 12/1956 | Clark, Jr. . |
| 4,043,257 | 8/1977 | Aaberg . |
| 4,158,462 | 6/1979 | Coral . |
| 4,656,329 | 4/1987 | Moerke ............................ 219/137.41 |
| 4,714,010 | 12/1987 | Smart ............................ 454/64 |
| 5,015,822 | 5/1991 | Mann ............................ 219/137.41 |
| 5,326,314 | 7/1994 | Brockway et al. ............................ 454/66 |

FOREIGN PATENT DOCUMENTS

| | | | |
|---|---|---|---|
| 2-2513 | 10/1990 | Japan | ............................ 219/125.1 |

*Primary Examiner*—Clifford C. Shaw
*Attorney, Agent, or Firm*—Young, MacFarlane & Wood

[57] ABSTRACT

A method and apparatus for ventilating a robotic welding enclosure. A hood is positioned on the welding head structure of each robotic welder and includes an annular skirt portion in surrounding relation to the feed axis of the welding materials. The skirt defines a lower opening which is positioned proximate the welding locus so as to define a capture chamber extending upwardly from the skirt portion opening in surrounding relation to the feed axis of the welding materials. A vacuum condition is created in the capture chamber so as to suck the gaseous welding bi-products generated at the welding locus upwardly into the capture chamber from where the gases are moved via a flexible conduit to an overhead duct which carries the welding products to a location outside the welding enclosure for discharge.

19 Claims, 5 Drawing Sheets

METHOD AND APPARATUS FOR WELDING VENTILATION

BACKGROUND OF THE INVENTION

This invention relates to ventilation systems and more particularly to a ventilation system especially suited for use with robotic welding apparatus.

Robotic welding apparatus are in common use in industries such as the automobile industry, and typically are used in groups where each robotic welder performs a successive weld on a particular structure such, for example, as an automotive frame. Whereas robotic welders are especially efficient in performing such a serial welding operation, they generate large amounts of gaseous welding bi-products which quickly contaminate the area or enclosure in which the robotic welders are situated. The gaseous welding bi-products quickly coat everything in the area with contaminants and, more importantly, quickly make the atmosphere unsuitable for human occupation. In order to keep the atmosphere surrounding robotic welders at an acceptable purity level, it has been proposed to constantly feed large volumes of fresh air into the welding area while constantly evacuating large volume of air from the welding area so that the air in the welding area is exchanged on a frequent basis and the purity level of the air is thereby maintained at an acceptable level. However, this air-exchange methodology suffers from the disadvantage that the incoming air, especially in cold, ambient air conditions, must be heated prior to being delivered to the welding area, and the cost of heating such large quantities of air is significant and adds significantly to the overall cost of the welding operation.

SUMMARY OF THE INVENTION

This invention is directed to the provision of an improved ventilation methodology and apparatus especially suitable for use with robotic welders.

The invention provides a simple and effective means of removing the gaseous welding products generated by a robotic welder of the type including a robotic arm and a welding head positioned on a free end of the arm and defining a head structure, a welding locus, and means for feeding welding materials along a feed axis from the head structure to the welding locus.

According to the invention methodology, a hood having an annular skirt portion defining a lower opening is provided; the hood is positioned on the head structure of the robotic welder with the annular skirt portion in surrounding relation to the feed axis and with the lower skirt portion opening positioned proximate the welding locus so as to define a capture chamber extending upwardly from the skirt portion opening in surrounding relation to the feed axis; and a vacuum condition is created in the capture chamber to move the gaseous welding products generated at the welding locus upwardly into the capture chamber. This close capture methodology provides a simple and efficient means for removing the majority of the gaseous welding bi-products generated at the welding locus.

According to a further feature of the invention methodology, the step of creating a vacuum condition in the capture chamber comprises connecting the capture chamber to a vacuum source via a conduit means, and the method includes the further step of transporting the gaseous welding bi-products via the conduit means from the capture chamber to a remote discharge location. This methodology further facilitates the ready and efficient removal of the majority of the gaseous welding bi-products from the area of the welding operation.

According to a further feature of the invention methodology, the head structure includes a primary head mounted on the robotic arm and an auxiliary head mounted for rotation on the primary head, and the method further includes providing a hood mounting structure, fixedly securing the hood mounting structure to the primary head, and fixedly securing the annular skirt portion to the mounting structure in surrounding relation to the auxiliary head. This specific methodology for constructing and mounting the invention hood structure defines an effective capture chamber around the welding locus without interfering with the overall operation of the robotic welder or interfering with the fixturing for holding the part to be welded.

According to a further feature of the invention methodology, the head structure further includes a nozzle structure secured to the auxiliary head and extending downwardly therefrom along the feed axis to the vicinity of the welding locus to deliver welding materials to the welding locus, and the method includes positioning the annular skirt portion in surrounding relation to the nozzle. This specific structure and positioning further facilitates the creation and maintenance of the capture chamber without interfering with the operation of the robotic welder.

The invention ventilation methodology is especially suitable for use with an enclosure containing a plurality of welders each having a welding head generating gaseous welding bi-products wherein fresh air is continuously supplied to the enclosure through an air inlet and removed from the enclosure through an air outlet to remove the gaseous welding products generated at the welding heads and maintain the air in the enclosure at a desired predetermined purity level. According to the invention methodology, a capture hood is mounted on the welding head of each welder in a position to capture the welding gases generated at that welding head and the welding gases captured in the hoods are transported to a location outside the enclosure via a ducting system that is connected to the hoods and is independent of the enclosure air outlet. This methodology significantly reduces the quantity of fresh air that must be supplied to the enclosure to maintain the predetermined purity level and thereby significantly reduces the cost of heating the incoming air.

The invention ventilation apparatus is intended for use in removing the gaseous welding products generated by a welding system including a plurality of robotic welders with each welder including a robotic arm and a welding head positioned on a free end of the arm and defining a head structure, a welding locus, and means for feeding welding materials along a feed axis from the head structure to the welding locus. The invention ventilation apparatus includes a plurality of hoods with each hood having an annular skirt portion defining a lower opening; a hood is positioned on the head structure of each welding head with the annular skirt portion in surrounding relation to the feed axis and with the lower opening positioned proximate the welding locus to define a capture chamber extending upwardly from the skirt portion opening in surrounding relation to the feed axis; and the ventilation apparatus further includes means connecting each capture chamber to a vacuum source and operative to create a vacuum condition in the capture chamber to cause the gaseous welding bi-products generated at each welding locus to move upwardly into the respective capture chamber. This system and apparatus provides a simple and effective means for removing the majority of the gaseous welding bi-products generated by the robotic welders of a welding system.

According to a further feature of the invention apparatus, the robotic welders are positioned in a welding enclosure and the ventilation apparatus includes means for transporting the gaseous welding products from the capture chambers to a location outside of the welding enclosure. This arrangement provides a simple and efficient means of removing the majority of the gaseous welding bi-products from the welding enclosure.

According to a further feature of the invention ventilation apparatus, the welding gases captured in the capture chambers are evacuated to a location outside of the welding enclosure via conduit means connected to the capture hoods, and the ventilation system further includes means for supplying fresh air to the enclosure on a continuous basis, and means for exhausting air from the enclosure, in addition to the welding gases exhausted via the conduit means, on a continuous basis. This arrangement allows the majority of the gaseous welding bi-products generated by the welders to be exhausted from the enclosure utilizing the capture chambers and further provides a continuous flow of fresh air through the enclosure to remove the remainder of the gaseous welding products and maintain a clean atmosphere within the enclosure.

BRIEF DESCRIPTION OF THE DRAWING

FIG. 7 is a perspective view of a hood mounting structure utilized in the invention welding ventilation system.

DETAILED DESCRIPTION OF THE PREFERRED EMBODIMENT

Figure 1:
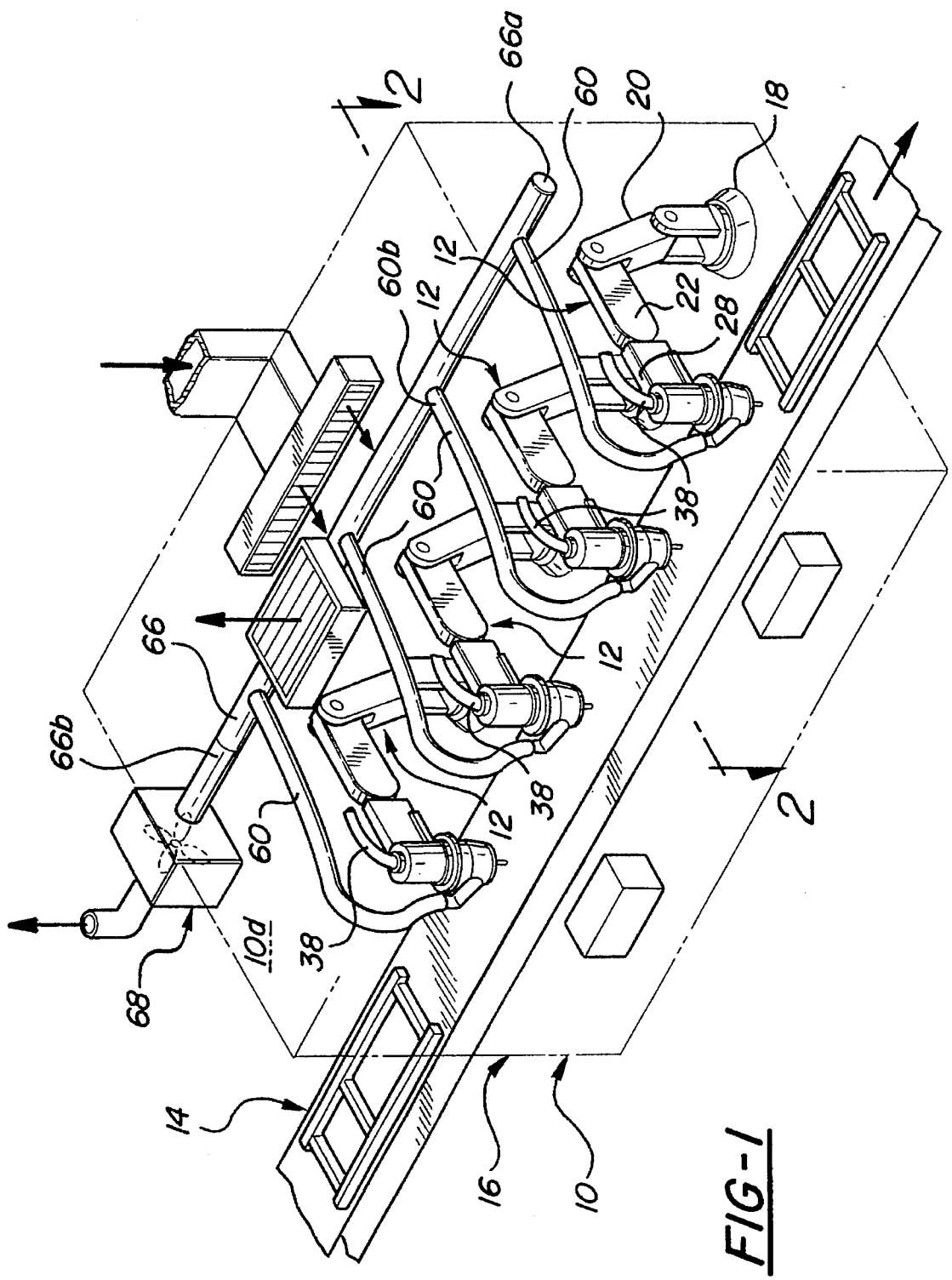
FIG. 1 is a somewhat schematic, perspective view illustrating a welding ventilation system according to the invention.
Figure 2:
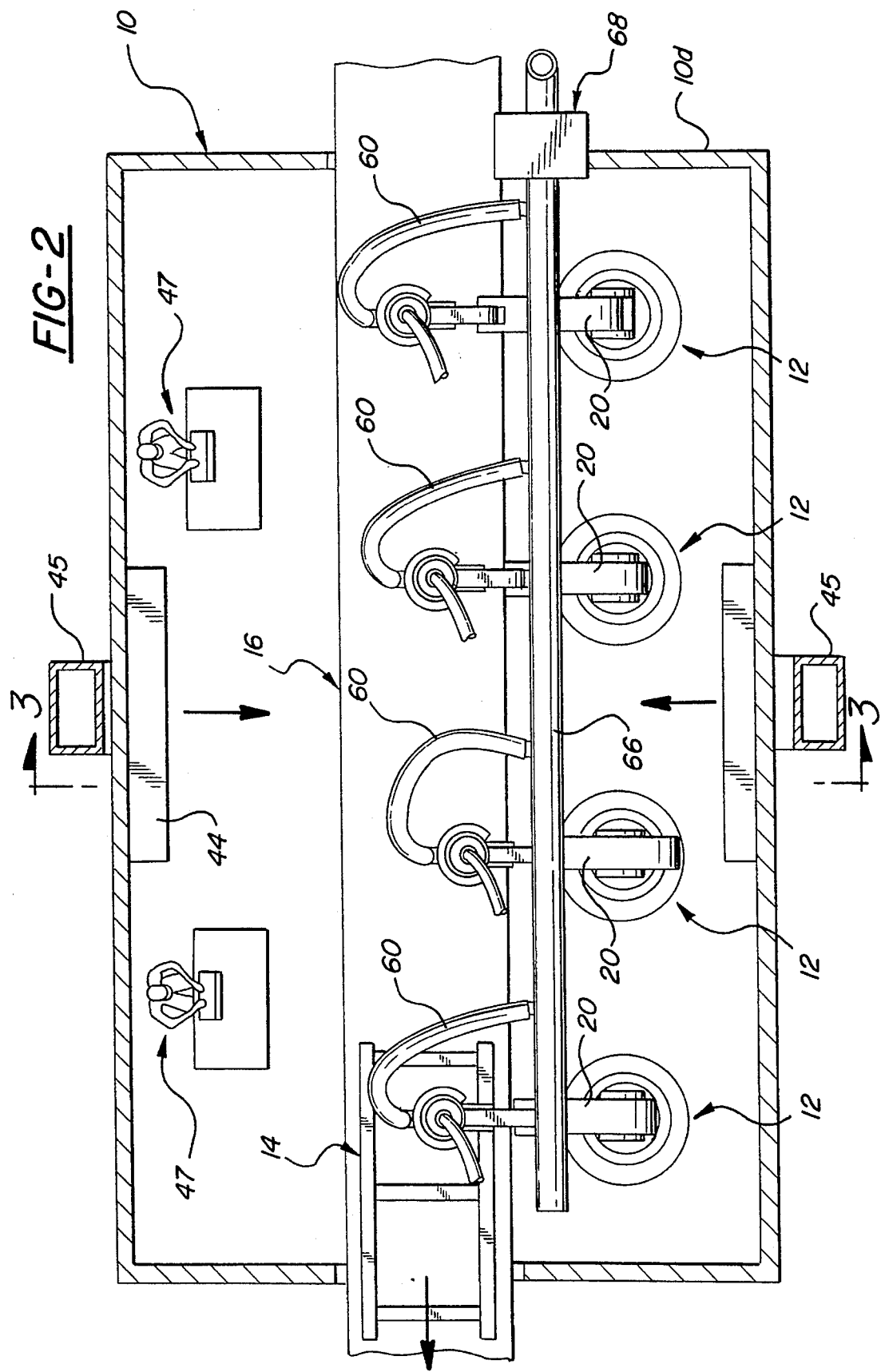
FIG. 2 is a plan view of the system of FIG. 1.
Figure 3:
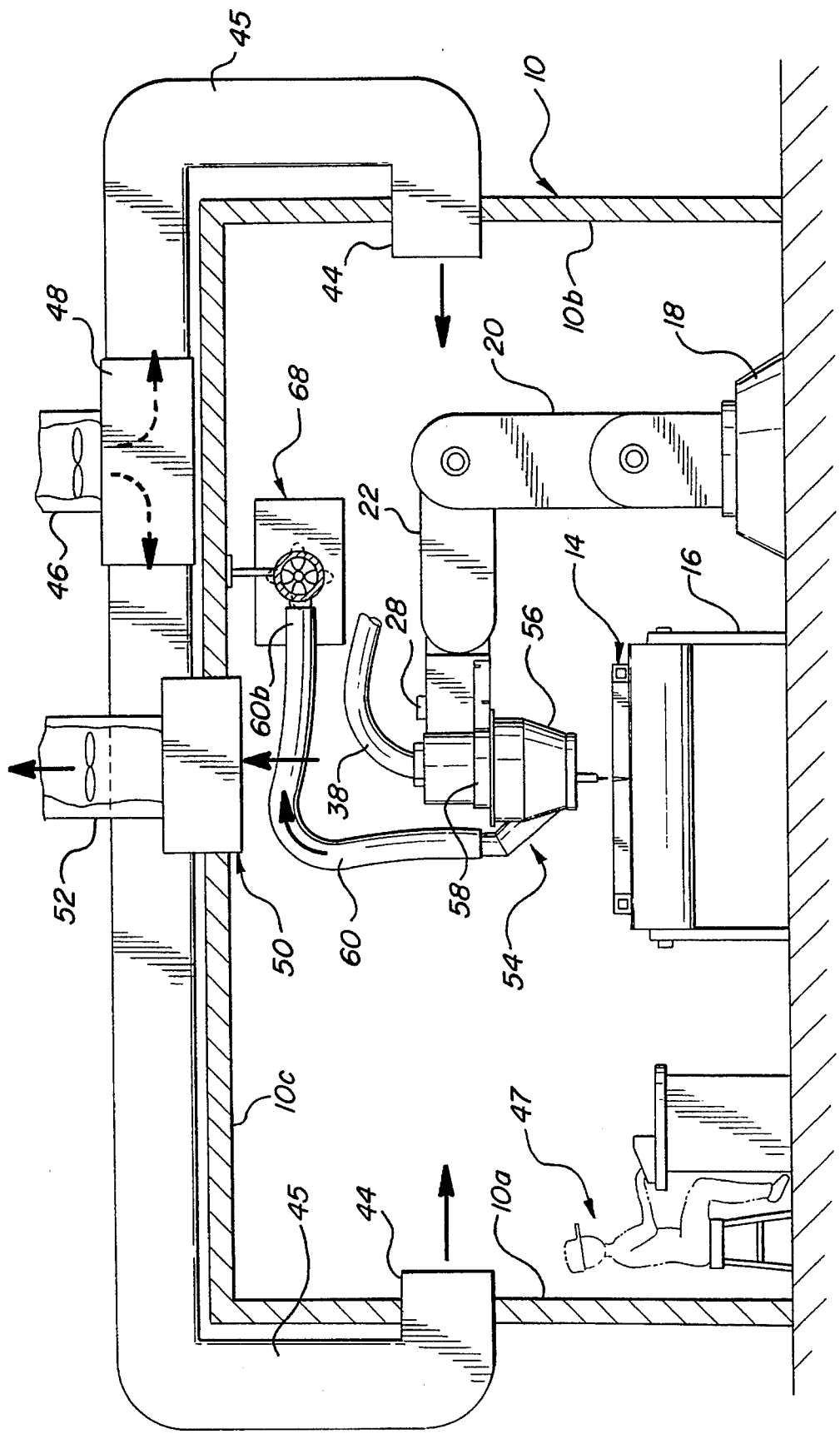
FIG. 3 is a cross-sectional view taken on line 3—3 of FIG. 2.
Figure 4:
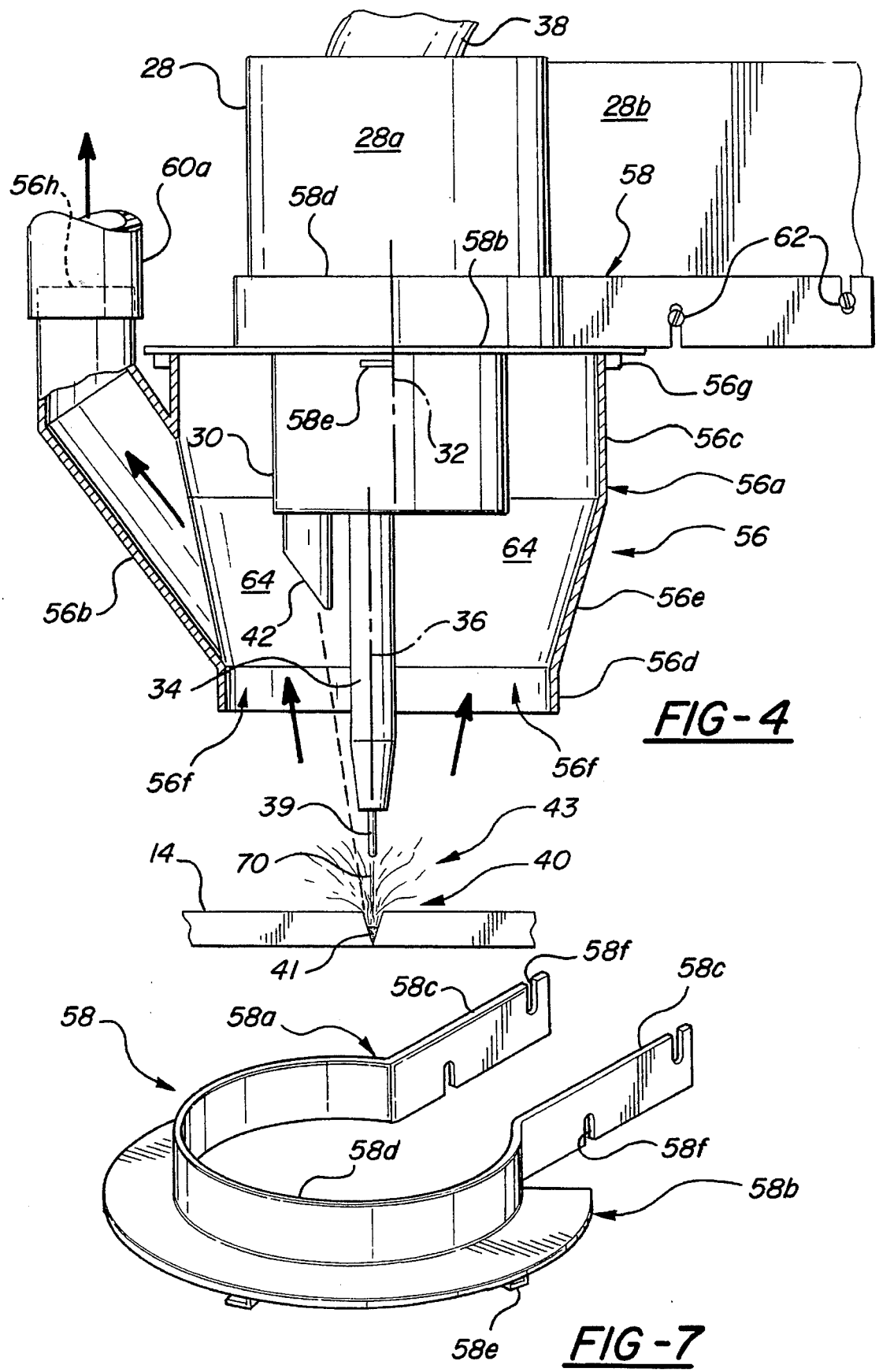
FIG. 4 is a detail view of a portion of the invention welding ventilation apparatus.
Figure 5:
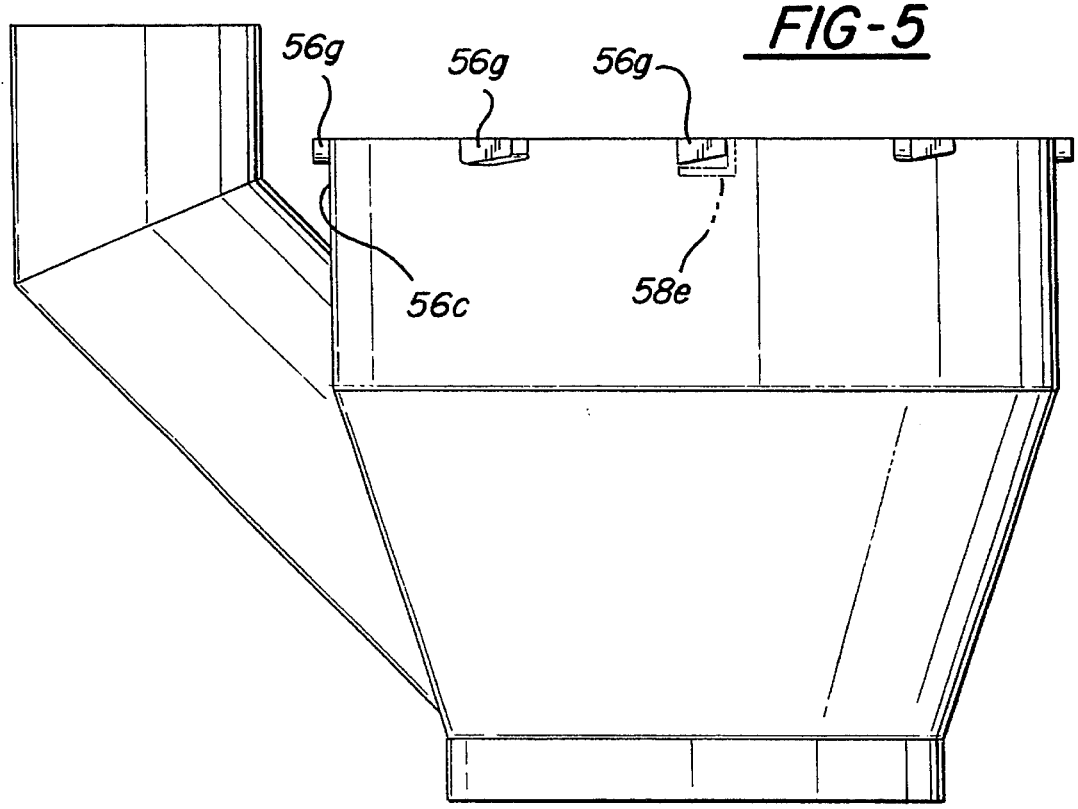
FIGS. 5 and 6 are cross-sectional and plan views respectively of a capture hood utilized in the invention welding ventilation system.
Figure 6:
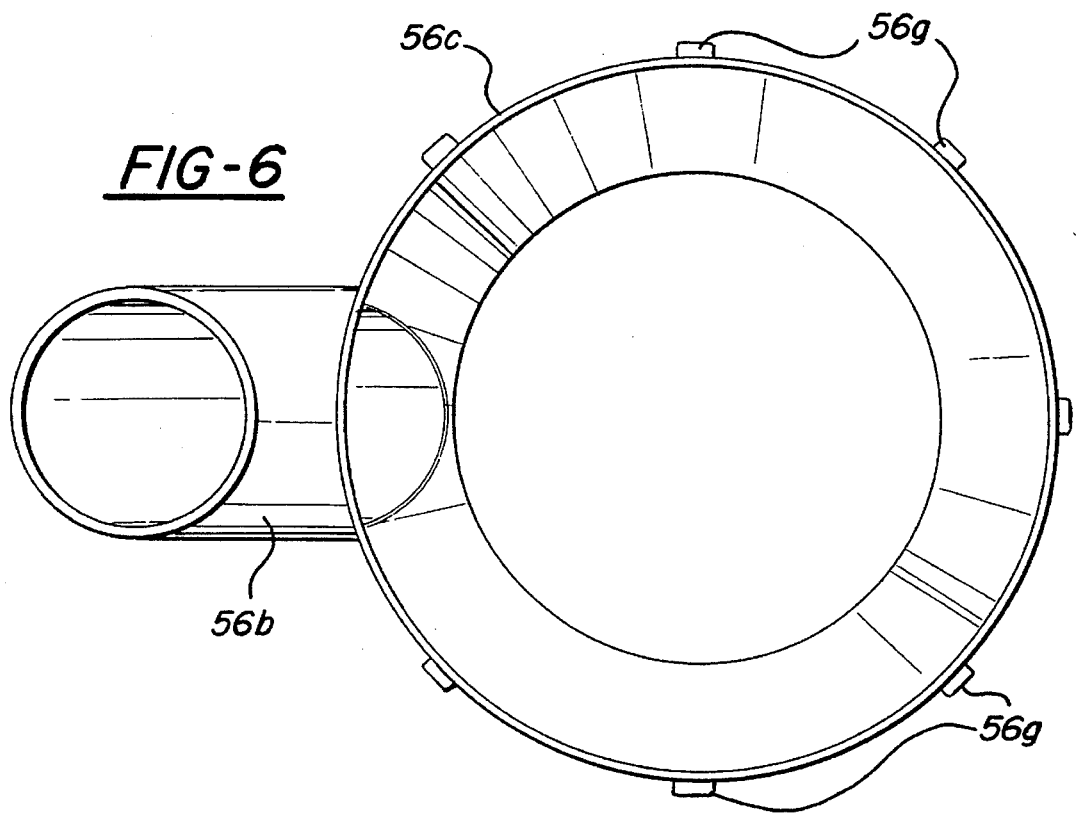

The welding ventilation method and apparatus is illustrated in FIGS. 1-3 in association with a welding enclosure 10 including a plurality of robotic welders 12 which are serially arranged within the enclosure and are operative in known manner to perform a series of welding operations on a structure, such as an automotive frame 14, which is moved into, through, and out of the enclosure via a conveying system shown schematically at 16 so that the frame structure 14 may enter the enclosure in an unwelded condition and may leave the enclosure in a welded condition.

Each robotic welder 12 includes a base structure 18, a primary arm 20 pivotally mounted on the base structure 18, a secondary arm 22 pivotally secured to the primary arm 20, and a welding head 24 positioned on the free end of the secondary arm 22.

Welding head 24 includes a head structure 26 which in turn includes a primary head 28 and an auxiliary or secondary head 30. Primary head 28 is rotatably secured to the free end of secondary robotic arm 22 and secondary or auxiliary head 30 is mounted for rotation on primary head 28 about an axis 32.

Welding head 24 further includes a torch or nozzle 34 extending downwardly from auxiliary head 30 and defining a welding material feed axis 36 which may coincide with axis 32 or, as shown, may be somewhat offset from axis 32 so that rotation of auxiliary head 30 on primary head 28 imparts a somewhat eccentric movement to the nozzle or torch 34. Welding materials such as inert gas and a welding wire 39 are supplied to the welding head via a supply conduit 38 and moved downwardly through nozzle 34 along feed axis 36 to a welding locus 40 where a weld 41 may be performed in known manner on the frame 14. Weld 41 may comprise a seam weld and welding head 24 may include a sensor 42 mounted on auxiliary head 30 and operative to track the seam 41 and guide the welding head along the seam weld. The welding operation performed at the welding locus 40, in known manner, generates gaseous welding products 43 which, if not removed, will quickly contaminate the welding enclosure and make occupation of the enclosure by humans, such as control console operators 47, unpleasant and hazardous.

In order to remove the gaseous welding bi-products, fresh incoming air is continuously supplied to the enclosure 10 via incoming grilles 44 positioned in the opposite side walls 10a and 10b of the enclosure. The incoming air is delivered to the incoming air grilles 44 via ducts 45 which are in turn connected to an incoming duct 46 receiving air from a blower device located outside of the enclosure. The air incoming through duct 46 passes through a heater 48 where it is heated to a temperature consistent with the ambient temperature within enclosure 10.

An outlet grille 50 is also provided in the ceiling 10c of the enclosure and grille 50 in turn communicates with a duct 52 connecting with an exhaust device located outside the enclosure. Incoming grilles 44 and outlet grille 50 will be seen to provide a steady flow of fresh air into and out of the enclosure to assist in the removal of the gaseous welding bi-products generated at the various welding loci 40.

According to the invention, a hood assembly 54 is provided in association with each welding head to capture the majority of the gaseous welding bi-products generated at the respective welding locus for removal from the welding enclosure.

Each hood assembly includes a hood 56, a mounting structure 58, and a flexible conduit 60.

Hood 56 includes an annular skirt portion 56a and a spout or outlet portion 56b opening in the skirt portion 56a. Skirt portion 56a includes an upper cylindrical section 56c, a lower cylindrical section 56d, and an intermediate conical section 56e interconnecting cylindrical sections 56c,56d. Skirt portion 56a defines a lower opening 56f, and a plurality of locking tabs 56g are provided along the upper edge of cylindrical section 56c at circumferentially spaced locations, for example, every 45 degrees.

Mounting structure 58 includes a mounting bracket portion 58a and a mounting flange portion 58b. Mounting bracket portion 58a defines bracket arms 58c and an arcuate central bracket portion 58d. Flange portion 58d is essentially circumferentially coextensive with central bracket portion 58d and a plurality of circumferentially spaced angle brackets 58e are secured to the lower face of flange 58b for coaction with locking tabs 56g on hood 56.

A mounting bracket 58 is fixedly secured to the primary head 28 of each robotic welder and a hood 56 is fixedly secured to each mounting bracket in surrounding relation to the auxiliary head 30 and the torch or nozzle 34 of the respective welding head.

Bracket portion 58d is sized to fit around the arcuate surface defined by the forward cylindrical portion 28a of the primary head 28 and the bracket arms 58c of the mounting bracket are adapted to be secured in quick connect fashion to the opposite side faces of a prismatic rear portion 28b of the primary head utilized slots 58f along the upper and lower edges of the bracket arms coacting with suitable fasteners 62 on the welding head.

Hood 56 is adjustably but fixedly mounted on mounting bracket 58 by positioning the upper edge of cylindrical skirt section 56c beneath the flange portion 58b of the mounting bracket and turning the hood about axis 32 to bring a series of locking tabs 56g on the hood into locking coaction with a respective series of angle brackets 58e on the flange portion 58b of the mounting bracket, whereby to position outlet spout 56b selectively with respect to axis 32 with the precise positioning of the spout 56b depending upon the space availability provided by the specific robotic welder installation.

With the mounting bracket fixedly secured to the primary head 28 and the hood 56 fixedly secured to the mounting bracket in surrounding relation to the auxiliary head 30 and the nozzle or torch 34, a capture chamber 64 is defined around the auxiliary head and around the nozzle and extends upwardly from hood opening 56f in surrounding relation to the feed axis 36. With the hood 56 installed in surrounding relation to the feed axis to establish the capture chamber, conduit 60, which is formed of a suitable flexible material, is secured at its lower end 60a to the upper end 56h of the spout 56b and the upper end 60b of the conduit 60 is connected to a return duct 66 which is suitably suspended from the ceiling 10c of the enclosure and extends essentially from end to end of the enclosure. One end 66a of the duct is blocked, and the other end 66b of the duct extends through an end wall 10d of the enclosure for connection with an exhaust fan assembly 68 positioned outside of the enclosure.

In the operation of the robotic welder, it will be understood that welding wire 39 is continuously fed downwardly through nozzle 34 together with an inert gas such as argon and an arc 70 is struck between the free end of the wire 39 and the welding locus 40 to generate the welding action at the welding locus and form weld 41. As the welding action occurs, gaseous welding products 43, including high density smoke, are generated at the welding locus and must be removed to avoid contaminating the enclosure. According to the invention, the exhaust mechanism 68, via the duct 66 and the conduits 60, creates a vacuum condition in each of the close capture chambers 64 so that the gaseous welding bi-products generated at the welding loci are sucked upwardly into the capture chambers 64 whereafter they are discharged through the spouts 56b and through the conduits 60 to the duct 66 whereafter they are conveyed to a location outside of the welding enclosure.

These close capture hoods have been found to be extremely effective in removing the gaseous welding bi-products from the welding locus and specifically have been found to dramatically reduce the amount of fresh air that must be supplied to the welding enclosure to maintain a specific acceptable level of air purity.

For example, in a test environment in which the enclosure included 27 robotic welders operating without benefit of the invention capture hood system, it was found necessary to provide approximately 50,000 cfm of fresh air to the enclosure to maintain the specific acceptable level of air purity whereas, when the capture hood system was added, it was found that the specific acceptable level of air purity could be maintained in the enclosure with a fresh air flow rate of approximately 25,000 cfm. With the capture hoods operating, the exhaust system 60/66/68 was set to operate at a vacuum of 30 inches of water, outlet grille 50 was set to operate at a vacuum of 3 inches of water, 75 cfm flowed through each hood, approximately 25,000 cfm was introduced through inlet grille 44, and approximately 24,500 cfm left the enclosure through outlet grille 50. The dramatic reduction in the fresh air required to maintain the enclosure air at a specific acceptable purity level was due to the fact that approximately 80% of the gaseous welding bi-products generated at the welding loci were removed through the capture chambers and through the duct 60 so that only 20% was discharged into the general atmosphere of the enclosure for removal by the fresh air incoming through the incoming grilles 44. Thus the amount of air required to be inputted into the enclosure on a continuous basis via the inlet grilles 44 for exhaust through the overhead grille 50 was reduced by approximately 50% as compared to the amount required without the capture hoods, thereby reducing by 50% the cost of heating the incoming air and substantially reducing the overall cost of the welding operation.

It will be understood that the capture hoods operate to preclude the dumping of the gaseous welding contaminants into the general atmosphere of the enclosure with the result that, in order to maintain a given acceptable level of air purity within the enclosure, the total atmosphere within the enclosure does not have to be interchanged as often as it would have to be interchanged without the close capture hoods.

It will further be understood that the fresh air supply is always maintained at a level somewhat less than the exhaust so as to allow seepage of a certain amount of air through the walls and ceiling of the enclosure and thereby ensure that there is no outflow of air from the enclosure into the general plant environment in which the enclosure is located.

The invention will be seen to provide a simple and efficient means of ventilating a welding enclosure and, specifically, will be seen to provide a means of efficiently ventilating a robotic welding enclosure at a greatly reduced cost as compared to previous arrangements. The invention also provides a cleaner environment within the enclosure with the result that it is not necessary to put jackets over the robotic welders and ancillary equipment.

Whereas a preferred embodiment of the invention has been illustrated and described in detail, it will be apparent that various changes may be made in the disclosed embodiment without departing from the scope or spirit of the invention.

I claim:

1. A method of removing the gaseous welding byproducts generated by a robotic welder of the type including a robotic arm and a welding head position on a free end of the arm and defining a head structure, a welding locus, and a nozzle extending downwardly from the head structure for feeding welding materials along a feed axis defined by the nozzle from the head structure to the welding locus, the method comprising:

providing a hood having an upper mounting structure and an annular skirt extending downwardly from the upper mounting structure and defining a lower opening;

positioning the hood upper mounting structure on the head structure with the annular skirt extending downwardly in surrounding relation to the nozzle and with the lower skirt opening positioned proximate the welding locus, whereby to define a capture chamber extending upwardly from the lower opening in surrounding relation to the nozzle; and creating a vacuum condition in the capture chamber to move the gaseous welding bi-products generated at the welding locus upwardly into the capture chamber.

2. A method according to claim 1 wherein:

the step of creating a vacuum condition in the capture chamber comprises connecting the capture chamber to a vacuum source via a conduit means; and the method includes the further step of transporting the gaseous welding bi-products via the conduit means from the capture chamber to a remote discharge location.

3. A method according to claim 1 wherein:

the head structure includes a primary head mounted on the robotic arm and an auxiliary head mounted for rotation on the primary head;

the hood mounting structure and the hood skirt are formed as separate elements; and the method further includes fixedly securing the hood mounting structure to the primary head, and fixedly securing the annular skirt to the mounting structure in surrounding relation to the auxiliary head.

4. A method according to claim 3 wherein:

the method includes positioning a sensor in the capture chamber proximate the nozzle and in a position to look through the lower opening so as to enable the sensor to track a welding seam being formed at the welding locus.

5. A method of removing the gaseous welding bi-products generated by a welding system including a plurality of robotic welders with each welder including a robotic arm and a welding head positioned on a free end of the arm and with each welding head defining a head structure, a welding locus, and a nozzle extending downwardly from the head structure for feeding welding materials along a feed axis defined by the nozzle from the head structure to the welding locus, the method comprising:

providing a plurality of hoods with each hood having an upper mounting structure and an annular skirt extending downwardly from the upper mounting structure and defining a lower opening;

positioning a hood upper mounting structure on the head structure of each welding head with the annular skirt of the hood in surrounding relation to the respective nozzle and with the lower opening positioned proximate the welding locus to define a capture chamber extending upwardly from the lower opening in surrounding relation to the nozzle; and creating a vacuum condition in each capture chamber to move the gaseous welding bi-products generated at each welding locus upwardly into the respective capture chamber.

6. A method according to claim 5 wherein the method includes the further steps of positioning the robotic welders in a welding enclosure and transporting the gaseous welding products from the capture chambers to a location outside of the welding enclosure.

7. A method according to claim 6 wherein:

the gaseous welding bi-products from the capture chamber of each robotic welder are transported to a common exhaust duct extending to the outside location.

8. A method of removing gaseous welding bi-products from a welding enclosure in which a plurality of robotic welders are operating, each welder including a robotic arm and a welding head positioned on a free end of the robotic arm, each welding head defining a welding locus, the method comprising:

defining a capture chamber at each welding head including a lower chamber opening located proximate the welding locus;

creating a vacuum condition in each of the capture chambers to move the gaseous welding bi-products generated at a respective welding locus upwardly into the capture chamber;

transporting the gaseous welding bi-products from the capture chambers via an exhaust duct to a location outside of the enclosure;

supplying fresh air to the enclosure on a continuous basis; and removing air from the enclosure, in addition to the gaseous welding bi-products removed via the exhaust duct, on a continuous basis.

9. A method of ventilating an enclosure containing a plurality of welders each having a welding head generating gaseous welding bi-products wherein fresh air is continuously supplied to the enclosure through an air inlet and removed from the enclosure through an air outlet to remove the gaseous welding bi-products generated at the welding heads and maintain the air in the enclosure at a desired predetermined purity level, characterized in that the method includes the further steps of:

mounting a capture hood on the welding head of each welder in a position to capture the welding gases generated at that welding head; and transporting the welding gases captured in the hoods to a location outside of the enclosure via a ducting system that is connected to the hoods and is independent of the enclosure air outlet, whereby to reduce the quantity of fresh air that must be supplied to the enclosure to maintain the predetermined purity level.

10. A close capture hood for use with a robotic welder of the type including a robotic arm and a welding head positioned on a free end of the arm and defining a head structure, a welding locus, and a nozzle extending downwardly from the head structure for feeding welding materials along a feed axis defined by the nozzle from the head structure to the welding locus, characterized in that:

the hood includes an upper mounting structure and an annular skirt extending downwardly from the mounting structure and defining a lower opening;

the hood upper mounting structure is sized and adapted to be mounted on the head structure with the annular skirt extending downwardly in surrounding relation to the nozzle and with the lower opening positioned proximate the welding locus so as to define a capture chamber extending upwardly from the lower opening in surrounding relation to the nozzle; and the lower opening has a diameter that is at least twice the diameter of the nozzle and defines an annular area around the nozzle that is at least twice the cross-sectional area of the nozzle.

11. A close capture hood according to claim 10 wherein the hood further includes an outlet communicating with the capture chamber, the capture hood is part of a capture hood assembly, and the capture hood assembly further includes a flexible conduit connected to the hood outlet to facilitate removal of gaseous welding bi-products from the capture chamber.

12. A close capture hood according to claim 10 wherein the head structure of the welder includes a primary head connected to the robotic arm and an auxiliary head mounted for rotation on the primary head, characterized in that:

the hood upper mounting structure is adapted to be fixedly secured to the primary head with the skirt extending downwardly in surrounding relation to the auxiliary head.

13. A ventilation system for removing the gaseous welding bi-products generated by a robotic welder of the type including a robotic arm and a welding head positioned on a free end of the arm and defining a head structure, a welding locus, and a nozzle extending downwardly from the head structure for feeding welding materials along a feed axis defined by the nozzle from the head structure to the welding locus, characterized in that:

the ventilation system includes a hood having an annular skirt portion defining a lower opening;

the hood is positioned on the head structure with the annular skirt portion in surrounding relation to the nozzle and with the lower skirt portion opening positioned proximate the welding locus to define a capture chamber extending upwardly from the lower opening in surrounding relation to the nozzle;

the lower opening has a diameter that is at least twice the diameter of the nozzle and defines an annular area around the nozzle that is at least twice the cross-sectional area of the nozzle; and the ventilation system further includes a vacuum source connected to the capture chamber and operative to create a vacuum condition in the capture chamber to cause gaseous welding products generated at the welding locus to move upwardly into the capture chamber.

14. A ventilation system according to claim 13 wherein he head structure includes a primary head mounted on the robotic arm and an auxiliary head mounted for rotation on the primary head; the ventilation system further characterized in that:

the hood further includes a mounting structure;

the mounting structure is fixedly secured to the primary head; and the annular hood portion is fixedly secured to the mounting structure in surrounding relation to the auxiliary head.

15. A ventilation system for removing the gaseous welding bi-products generated by a welding system including a plurality of robotic welders with each welder including a robotic arm and a welding head positioned on a free end of the arm and defining a head structure, a welding locus, and a nozzle extending downwardly from the head structure for feeding welding materials along a feed axis defined by the nozzle from the head structure to the welding locus, characterized in that:

the ventilation system includes a plurality of hoods with each hood having an annular skirt portion defining a lower opening;

a hood is positioned on the head structure of each welding head with the annular skirt portion in surrounding relation to the nozzle and with the lower opening positioned proximate the welding locus to define a capture chamber extending upwardly from the lower opening in surrounding relation to the feed axis;

the lower opening of each hood has a diameter that is at least twice the diameter of the surrounded nozzle and defines an annular area around the nozzle that is at least twice the cross-sectional area of the surrounded nozzle; and the ventilation system further includes means connecting each capture chamber to a vacuum source and operative to create a vacuum condition in the capture chamber to cause the gaseous welding bi-products generated at each welding locus to move upwardly into the respective capture chamber.

16. A ventilation system according to claim 15 wherein the robotic welders are positioned in a welding enclosure and the ventilation system includes means for transporting the gaseous welding bi-products from the capture chambers to a location outside of the welding enclosure.

17. A ventilation system according to claim 16 wherein:

the transporting means includes a flexible conduit connected to each hood and a common exhaust duct connected to each conduit and extending to the outside location.

18. A ventilation system for removing gaseous welding bi-products from a welding enclosure in which a plurality of robotic welders are operating, each welder including a robotic arm and a welding head positioned on a free end of the robotic arm, each welding head defining a welding locus, the ventilation system including:

a plurality of capture hoods with one hood positioned on each welding head and defining a capture chamber including a chamber opening located proximate the welding locus, whereby welding gases are captured in each capture chamber;

conduit means connected to the capture hoods and operative to evacuate the welding gases captured in the capture chambers to a location outside of the enclosure;

means for supplying fresh air to the enclosure on a continuous basis; and means for exhausting air from the enclosure, in addition to the welding gases exhausted via the conduit means, on a continuous basis.

19. A robotic welder of the type including a robotic arm and a welding head positioned on a free end of the arm and defining a head structure, a welding locus, and a nozzle extending downwardly from the head structure for feeding welding materials along a feed axis defined by the nozzle from the head structure to the welding locus, characterized in that:

the welder further includes a hood including an annular skirt portion defining a lower opening;

the hood is sized and adapted to be mounted on the head structure with the annular skirt portion in surrounding relation to the nozzle and with the lower opening positioned proximate the welding locus so as to define a capture chamber extending upwardly from the lower opening in surrounding relation to the nozzle;

the lower opening has a diameter that is at least twice the diameter of the nozzle and defines an annular area around the nozzle that is at least twice the cross-sectional area of the nozzle; and the welder further includes a sensor positioned in the capture chamber proximate the nozzle and in a position to look through the lower opening so as to enable the sensor to track a welding seam being formed at the welding locus.

* * * * *